(12) United States Patent
Kim

(10) Patent No.: US 8,571,348 B2
(45) Date of Patent: Oct. 29, 2013

(54) APPARATUS AND METHOD FOR IMAGE NOISE REDUCTION BASED ON WEIGHTED PIXEL DIFFERENCE

(75) Inventor: Kang Soo Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 461 days.

(21) Appl. No.: 12/995,935

(22) PCT Filed: Jun. 3, 2009

(86) PCT No.: PCT/KR2009/002955
§ 371 (c)(1),
(2), (4) Date: Dec. 2, 2010

(87) PCT Pub. No.: WO2009/148262
PCT Pub. Date: Dec. 10, 2009

(65) Prior Publication Data
US 2011/0081096 A1    Apr. 7, 2011

(30) Foreign Application Priority Data
Jun. 3, 2008    (KR) .......................... 10-2008-0052043

(51) Int. Cl.
G06K 9/40    (2006.01)

(52) U.S. Cl.
USPC .......................................... 382/275

(58) Field of Classification Search
None
See application file for complete search history.

(56) References Cited

U.S. PATENT DOCUMENTS

| | | | | |
|---|---|---|---|---|
| 4,833,537 A | * | 5/1989 | Takeuchi et al. | 348/620 |
| 2004/0013197 A1 | * | 1/2004 | Park | 375/240.11 |
| 2007/0189586 A1 | * | 8/2007 | Monden | 382/124 |
| 2008/0317371 A1 | * | 12/2008 | Zhang et al. | 382/261 |

FOREIGN PATENT DOCUMENTS

| | | |
|---|---|---|
| EP | 1 847 957 A2 | 10/2007 |
| EP | 1 876 811 A2 | 1/2008 |

OTHER PUBLICATIONS

Chen, Qin-sheng, Michel Defrise, and F. Deconinck. "Symmetric phase-only matched filtering of Fourier-Mellin transforms for image registration and recognition." Pattern Analysis and Machine Intelligence, IEEE Transactions on 16.12 (1994): 1156-1168.*

* cited by examiner

*Primary Examiner* — Barry Drennan
*Assistant Examiner* — Andrew Moyer
(74) *Attorney, Agent, or Firm* — Birch, Stewart, Kolasch & Birch, LLP

(57) ABSTRACT

A device and method for removing noise in image are disclosed. A device for removing noise in image includes a signal delay part outputting arrangement of image delay signals generated by delaying input image signals in a predetermined time period, a pixel difference calculating part calculating pixel difference between the input image signal and the image delay signal and calculating a weighing factor applied to the pixel difference based on the calculated pixel difference by a non-linear function, a signal to noise ratio (SNR) measuring part converting the input image signals into frequency signals and calculating a weighing factor for each of the converted frequency signals to output a parameter of signal to noise ratio, and a pixel difference weighing factor generating part generating a weighing factor applied to a final pixel difference to remove noise by applying a range of the weighing factors calculated by the pixel difference calculating part to the weighing factor of the signal to noise ratio output by the SNR measuring part.

19 Claims, 5 Drawing Sheets

2A

2B

4A

4B

APPARATUS AND METHOD FOR IMAGE NOISE REDUCTION BASED ON WEIGHTED PIXEL DIFFERENCE

TECHNICAL FIELD

The present invention relates to a device and method for removing noise in video. More specifically, the present invention relates to a dynamic noise removing device that is able to reduce degradation of image quality in a display device because of noise, and a method for the same.

BACKGROUND ART

Recently, various kinds of signal processing methods have been under development to improve image quality of a display device. There is undesirable noise in a common display device and this noise would cause degradation of image quality. To reduce the noise, research and development for noise reducing algorithm haven been in progress.

DISCLOSURE

Technical Problem

As image signals are processed digitally, image signal degradation caused by noise has been reduced. However, with a larger screen of a display device recently, signals having noise, blurring, resolution deterioration caused by band limit of signals would occur.

Especially, according to conventional noise removing algorithms, image motion with respect to signals having high signal to noise ratio (SNR) is considered or image motion with respect to signals having low SNR is less considered such that lagging may occur in images. In addition, according to noise removing method according to Pixel difference, noise still exists in output images after the digital signal processing and thus high frequency image signals are unable to be presented clearly.

Technical Solution

To achieve these objects and other advantages and in accordance with the purpose of the invention, as embodied and broadly described herein, a device for removing noise in image includes a signal delay part outputting arrangement of image delay signals generated by delaying input image signals in a predetermined time period; a pixel difference calculating part calculating pixel difference between the input image signal and the image delay signal and calculating a weighing factor applied to the pixel difference based on the calculated pixel difference by a non-linear function; a signal to noise ratio (SNR) measuring part converting the input image signals into frequency signals and calculating a weighing factor for each of the converted frequency signals to output a parameter of signal to noise ratio; and a pixel difference weighing factor generating part generating a weighing factor applied to a final pixel difference to remove noise by applying a range of the weighing factors calculated by the pixel difference calculating part to the weighing factor of the signal to noise ratio output by the SNR measuring part.

The device may further include an operating part subtracting the input image signal from the image delay signal output by the signal delay part.

The device may further include a low pass filter filtering a low frequency image signal of the input image signals and the image delay signals.

The device may further include an absolute value detecting part detecting an absolute value from the filtered low frequency image signals and outputting the detected absolute value to the pixel difference calculating part.

The pixel difference calculating part calculating pixel difference between the input image signal and the image delay signal may calculate difference of pixels positioned in each end of the image delay signal arrangement in horizontal, vertical, right diagonal and left diagonal directions.

The image signal having the weighing factor output by the pixel difference calculating part applied thereto may have an equation: $P=KY_{CLF}+(1-K)Y_{DLF}+Y_{CHF}$ (P: Image Signal, K: Weighing Factor, $Y_{CLF}$: Low Frequency Signal Of Input Image Signal, YDLF: Low Signal Of Image delay signal, $Y_{CHF}$: High Frequency Signal Of Input Image Signal).

The weighing factor applied to the image signal may have the size between 0 and 1.

The parameter of the signal to noise ratio may include an input value of the signal to noise ratio and a weighing factor of the signal to noise ratio applied to the input value by a non-linear function.

The SNR measuring part may include a frequency converting part converting an input image signal into a frequency signal; a weighing factor calculating part calculating a weighing factor for each frequency based on the converted frequency signal; a signal calculating part calculating a weighed frequency signal by applying the calculated weighing factor to the frequency signal; and an estimated noise calculating part calculating estimated noise based on the weighed frequency signal and outputting a parameter of the signal to noise ratio based on the frequency signal and the estimated noise.

The pixel difference weighing factor generating part may include a pixel difference critical value memorizing part memorizing pixel difference values calculated by the pixel difference calculating part and the weighing factors applied to the pixel difference values; a SNR weighing factor adding part adding the parameter of the signal to noise ratio calculated by the SNR measuring part to the pixel difference values; a comparing part comparing the sizes of the weighing factors applied to the memorized pixel difference values with each other and determining a range of the weighing factors based on the parameter of the signal to noise ratio; a maximum pixel difference weighing factor calculating part applying a maximum value of the weighing factors applied to a critical value of the pixel difference values to the weighing factor range of the signal to noise ratio based on the result of the determination and calculating a weighing factor applied to a final pixel value to remove noise.

The range of the weighing factors applied to the final pixel values to remove noise may be $0 \leq K \leq A$ (A: Signal To Noise Ratio Weighing Factor).

The pixel difference critical value memorizing part may renew and memorize the pixel difference values of the image signals and the weighing factor applied to the pixel difference values.

In another aspect of the present invention, a method of removing noise in image includes steps of: outputting arrangement of image delay signals generated by delaying input image signals in a predetermined time period; calculating a weighing factor for each frequency from frequency signals converted from the input image signals and outputting a parameter of a signal to noise ratio; calculating a pixel difference value between the input image signal and the image delay signal and calculating a weighing factor applied to the pixel difference value based on the calculated pixel difference by a non-linear function; and applying a weighing factor to a final pixel value to remove noise, the weighing factor generated by applying a range of the weighing factors applied to the calculated pixel difference values to the weighing factor of the output signal to noise ratio.

The method may further include steps of: outputting a parameter of the signal to noise ratio; converting the input image signal into a frequency signal; calculating a weighing factor for each frequency based on the converted frequency signal; calculating a weighed frequency signal by applying the calculated weighing factor to the frequency signal; and calculating estimated noise based on the weighed frequency signal and outputting a parameter of a signal to noise ratio based on the frequency signal and the estimated noise.

The parameter of the signal to noise ratio may include an input value of the signal to noise ratio and a weighing factor of the signal to noise ratio applied to the input value by a non-linear function.

The calculating of the pixel difference value between the input image signal and the image delay signal may calculate difference of pixels positioned in each end of the image delay signal arrangement in horizontal, vertical, right diagonal and left diagonal directions. The image signal having the weighing factor applied thereto in the step of calculating the weighing factor applied to the pixel difference may have an equation: $P=KY_{CLF}+(1-K)Y_{DLF}+Y_{CHF}$ (P: Image Signal, K: Weighing Factor, YCLF: Low Frequency Signal Of Input Image Signal, $Y_{DFL}$: Low Frequency Signal Of Image delay signal, $Y_{CHF}$: High Frequency Signal Of Input Image Signal).

The weighing factor applied to the image signal may have the size between 0 and 1.

The step of applying the weighing factor removing noise to the final pixel value may include steps of: memorizing the calculated pixel difference and the weighing factor applied to the pixel difference; adding a range of the weighing factors applied to the pixel difference values by using the parameter of the signal to noise ratio; comparing the sizes of the memorized weighing factors applied to the pixel difference values with each other and determining a range of the weighing factors based on the parameter of the signal to noise ratio; and calculating the weighing factor applied to the final pixel value to remove noise by applying a maximum value of the weighing factors applied to the critical values of the pixel difference to the range of weighing factors of the signal to noise ratio based on the result of the determination.

The pixel difference value and the weighing factor may be renewed and memorized by the input image signal.

The range of the weighing factors (K) applied to the final pixel values to remove noise may be $0 \leq K \leq A$ (A: Signal To Noise Ratio Weighing Factor).

DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE

Reference will now be made in detail to the specific embodiments of the present invention, examples of which are illustrated in the accompanying drawings. Wherever possible, the same reference numbers will be used throughout the drawings to refer to the same or like parts.

Figure 1:
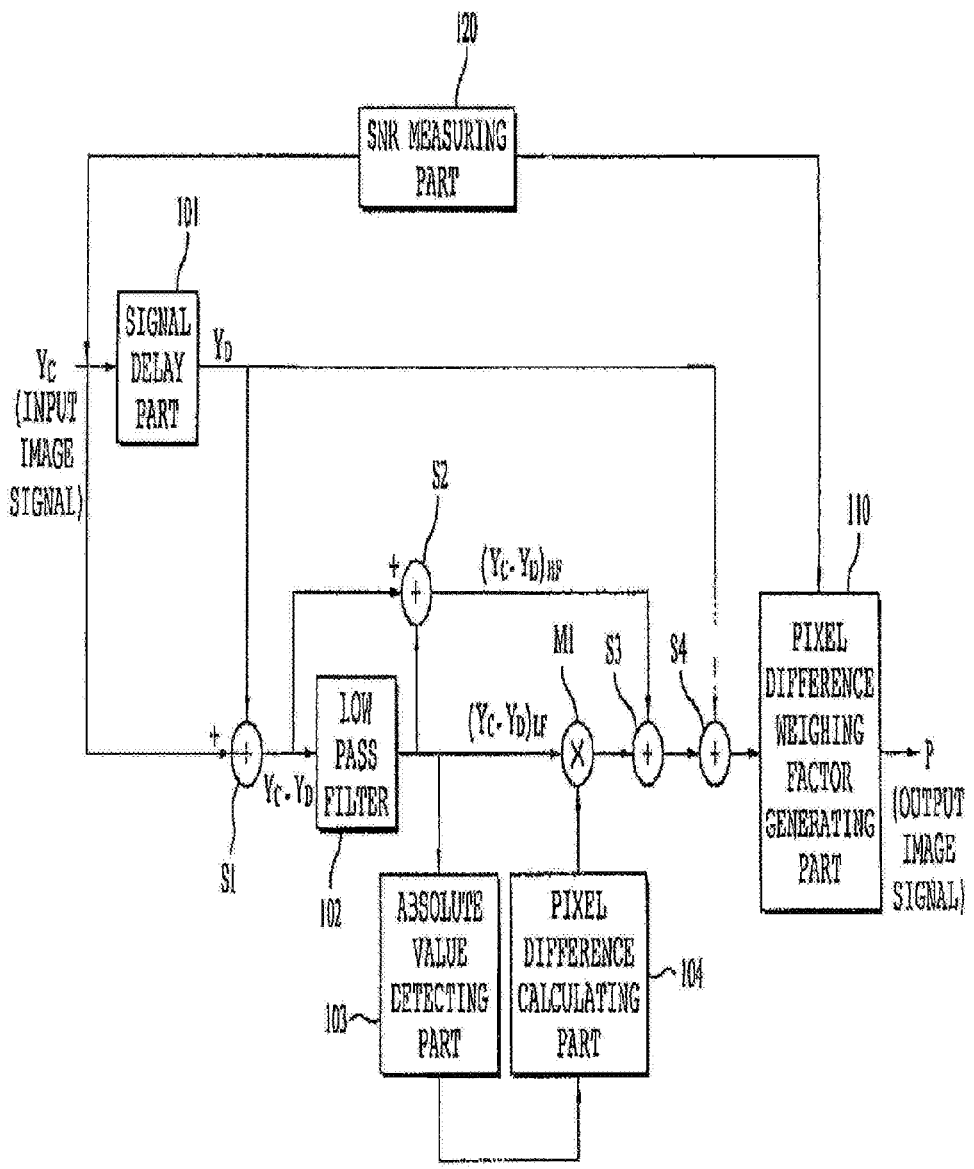
FIG. 1 is a block view schematically illustrating a device for removing noise of an image signal according to an exemplary embodiment of the present invention.
Figure 2:
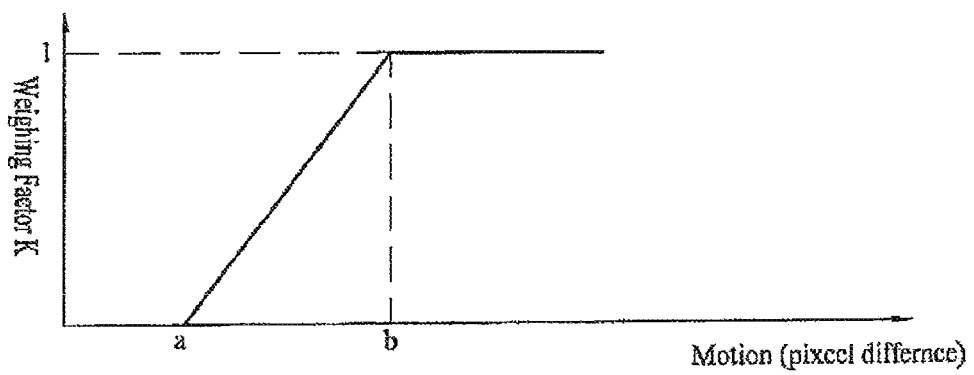
FIG. 2 including FIG. 2a and FIG. 2b is a diagram illustrating a noise removing algorithm applicable to the present invention.
Figure 2:
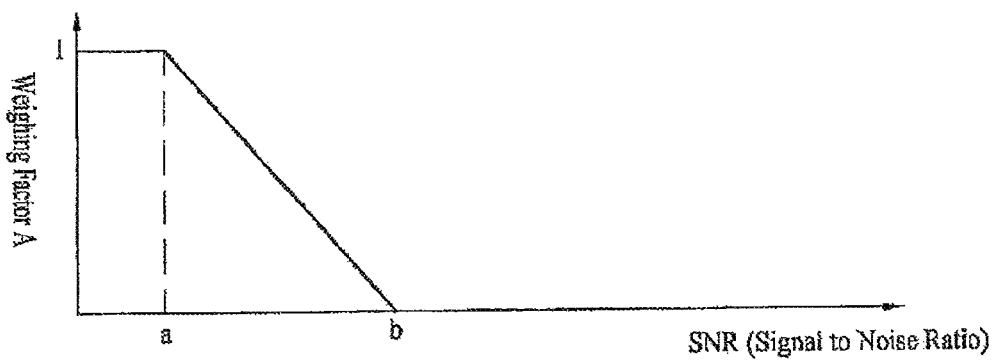

FIG. 1 is a block view schematically illustrating a device for removing noise of an image signal according to an exemplary embodiment of the present invention. FIG. 2a is a diagram illustrating a noise removing algorithm applied to pixel difference according to the present invention.

In reference to the drawings, a device for removing noise of an image signal includes a signal delay part 101, a low pass filter 102, an absolute value detecting part 103, a pixel difference calculating part 104, a pixel difference weighing factor generating part 110 and a SNR measuring part 120.

The signal delay part 101 delays an input image signal ($Y_C$) in horizontal and vertical directions to create an image delay signal arrangement ($Y_D$). Here, the term elay?means that the image signals inputted at a predetermined time interval, that is, pixel level signals are delayed to a single period and the pixel level signal is referenced to each pixel value in a range between 0 and 255.

In S1, an image delay signal ($Y_D$) output by the signal delay part 101 is subtracted from the input image signal ($Y_C$).

The operated image signal ($Y_C-Y_D$) in S1 is input in the low pass filter 102 and the low pass filter 102 passes only a low frequency image signal $(Y_C-Y_D)_{LF}$ of the input image signals ($Y_C-Y_D$).

The low frequency image signal $(Y_C-Y_D)_{LF}$ filtered by the low pass filter 102 is transmitted to the absolute value detecting part 103 and the absolute value detecting part 103 detects an absolute value.

The pixel difference calculating part 104 calculates difference between the present input image signal ($Y_C$) and the image delay signal ($Y_D$) based on the absolute value of the low frequency image signal $(Y_C-Y_D)_{LF}$. Especially, the pixel difference calculating part 104 calculates difference between pixels positioned at each end of the image signal arrangement generated by the difference between the present input image signals ($Y_C$) and the image delay signals ($Y_D$) in horizontal, vertical, right diagonal and left diagonal directions.

As shown in FIG. 2a, a weighing factor (K) for removing noise is calculated from the calculated pixel difference including critical values (a and b) by a non-linear function. The image signal $K(Y_C-Y_D)_{LF}$ the weighing factor (K) is added to in M1 is output based on the calculated pixel difference. Here, the weighing factor (K) applied to the critical values (a and b) of the pixel difference values to remove noise is a value between 0 and 1.

In S2, the filtered low frequency image signals are subtracted from the image signals ($Y_C-Y_D$) having subtraction operation in S1 and high frequency image signals $(Y_C-Y_D)_{HF}$ are generated.

In S3, the high frequency image signals $(Y_C-Y_D)_{HF}$ having subtraction operation in S2 are added to signals $K(Y_C-Y_D)_{LF}$ having the weighing factor output by the pixel difference calculating part 104 applied thereto and image signals P1 having a following equation are generated.

$$P_1 = K(Y_C - Y_D)_{LF} + (Y_C - Y_D)_{HF} \quad \text{[EQUATION 1]}$$

In S4, the image signal ($P_1$) generated in S3 may be added to the image delay signal output from the signal delay part 101 and image signal ($P_2$) having a following equation may be generated.

$$P_2 = K(Y_C - Y_D)_{LF} + (Y_C - Y_D)_{HF} + Y_D(Y_D = Y_{DLF} + Y_{DHF}) \quad \text{[EQUATION 2]}$$

That is, $$P_2 = K Y_{CLF} + (1-K) Y_{DLF} + Y_{CHF}$$

The pixel difference weighing factor generating part 110 limits a maximum value of the weighing factors generated based on the pixel difference of the input image signals ($P_2$) by using a SNR parameter and the maximum value is applied to a final pixel value only to generate a weighing factor able to remove noise. The final pixel value has a pixel value compensated between actual frames compensated dynamically according to SNR such that lagging in image may be reduced and that high frequency image may be presented more clearly.

The SNR measuring part 120 converts the input image signals into signals of a frequency domain (hereinafter, frequency signals) and it calculates a weighing factor from the converted frequency signals. Signals to noise ratio may be calculated based on estimated noise calculated from both of the frequency signals and the frequency signals having the weighing factor applied thereto. The signal to noise ratio is output to the pixel difference weighing factor generating part 110. The noise includes not only impulse noise included in image signals and but also additional noise of Gaussian and various noises caused by the other external elements.

Figure 3:
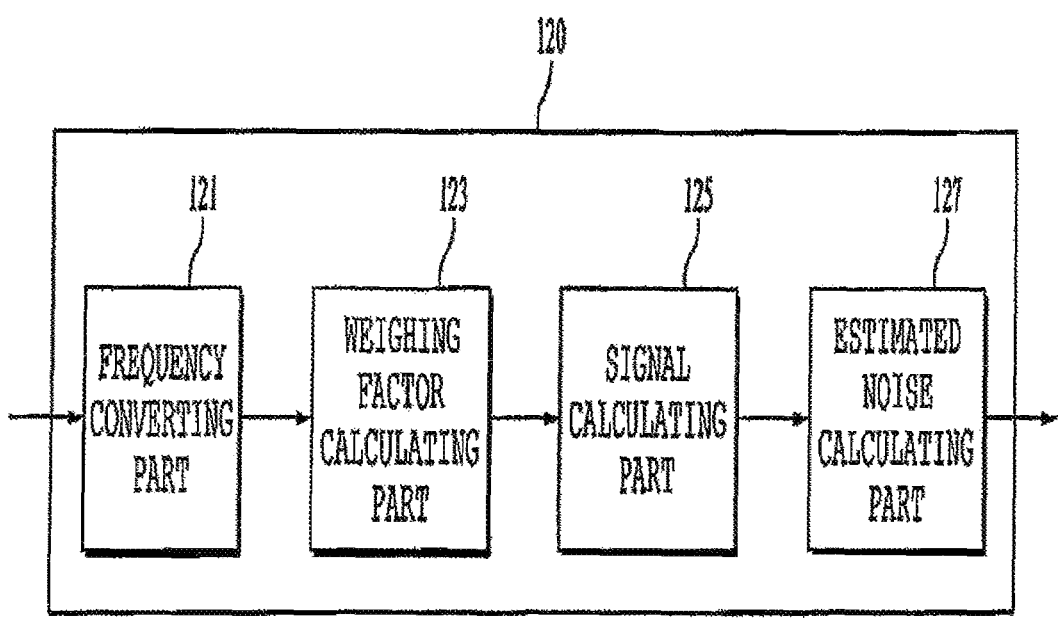
FIG. 3 is a block view illustrating a SNR measuring part of the image signal noise removing device.

FIG. 3 is a block view illustrating the SNR measuring part of the image noise removing device according to the present invention. FIG. 2b is a diagram illustrating a noise removing algorithm applied to the signal to noise ratio according to the present invention.

A frequency converting part 121 converts the input image signal ($Y_C$) into a frequency signal and it outputs the frequency signal.

The weighing factor calculating part 123 calculates a weighing factor based on the converted frequency signal output from the frequency converting part 121. Here, signal to noise ratio per frequency is calculated based on the frequency signal. As shown in FIG. 2b, an input value of the signal to noise ratio includes critical values (a and b) and a weighing factor (A) for removing noise is calculated by a non-linear function.

A signal calculating part 125 applies the weighing factor (A) calculated by the weighing factor calculating part 123 to the frequency signal to calculate a weighed frequency signal. An estimated noise calculating part 127 calculates estimated noise based on the weighed frequency signal and it calculates signal to noise ratio based on both of the frequency signal and the estimated noise.

Figure 4:
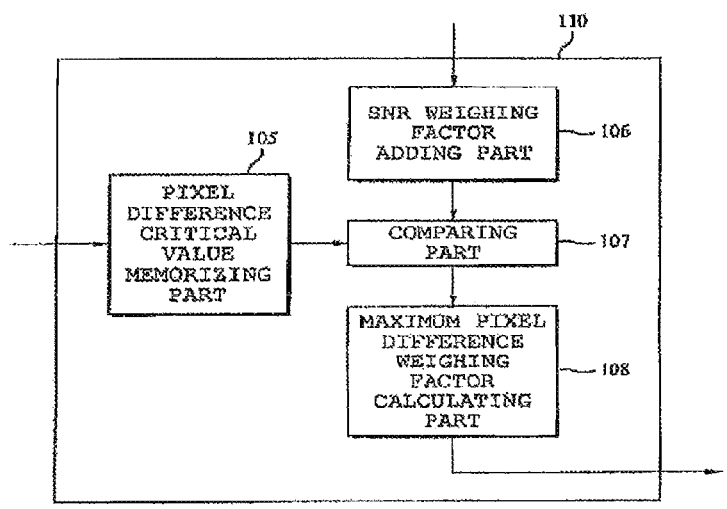
FIG. 4a is a block view illustrating a pixel difference weighing factor generating part of the image noise removing device.
FIG. 4b is a diagram illustrating a noise removing algorithm of pixel difference weighing factor by using a SNR parameter.
Figure 4:
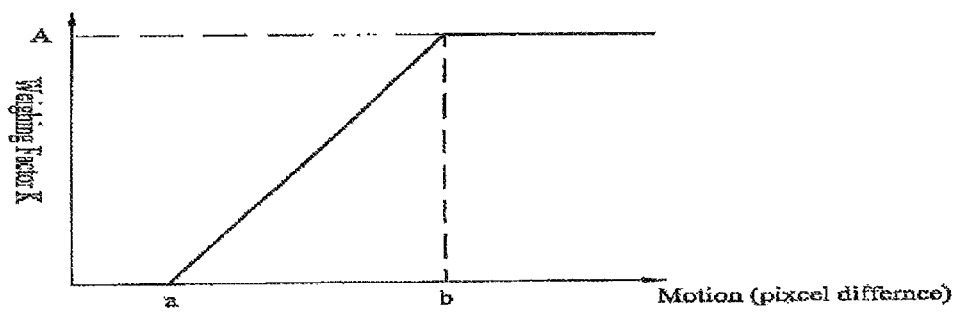

FIG. 4a is a block view illustrating a pixel difference weighing factor generating part of the image noise removing device according to the present invention. FIG. 4b is a diagram illustrating a noise removing algorithm of pixel difference weighing factor by using a SNR parameter according to the present invention.

A pixel difference critical value memorizing part 103 memorizes the pixel difference calculated by the pixel difference calculating part 104 and the weighing factor (K) applied to the pixel difference. The pixel difference critical value memorizing part 103 renews and memorizes each of the values according to the input image signals.

A SNR weighing factor adding part 106 adds a range of weighing factors (K) removing noise to the pixel difference values of the input image by using the parameter of the signal to noise ratio calculated by the estimated noise calculating part 127. Here, the range of the weighing factors (K) is a weighing factor (A) of the signal to noise ratio.

Based on the input value of the signal to noise ratio, 1 or 0 of a weighing factor (A) is output from the critical values (a and b) by a non-linear function. In case of small SNR, a weighing factor rank of 1 is output and in case of large SNR, a weighing factor rank of 0 is output.

A comparing part 107 compares the sizes of the weighing factor (K) applied to the pixel difference based on the parameter of the signal to noise ratio output by the SNR weighing factor adding part 106 and the comparing part 107 determines the range of the weighing factors (K) based on the parameter of the signal to noise ratio output by the SNR weighing factor adding part 106. As mentioned above, the pixel difference and the weighing factor (K) are memorized in the pixel difference critical value memorizing part 105.

A maximum pixel difference weighing factor calculating part 108 calculates a maximum value of the weighing factors (K) applied to the critical values (a and b, see 4b) of the input image within a range of the weighing factors (A) based on the result of the determination by the comparing part 107.

As shown in FIG. 4b, the maximum of the weighing factors (K) applied to the pixel difference critical values (a and b) to remove noise is limited by the weighing factor (A) of the signal to noise ratio and a pixel compensating value is determined. That is, the range of the weighing factors (K) applied to the pixel difference has a following equation.

$$0 = K = A \text{ (}A\text{: Weighing Factor Of Signal To Noise Ratio)} \quad \text{[EQUATION 3]}$$

Figure 5:
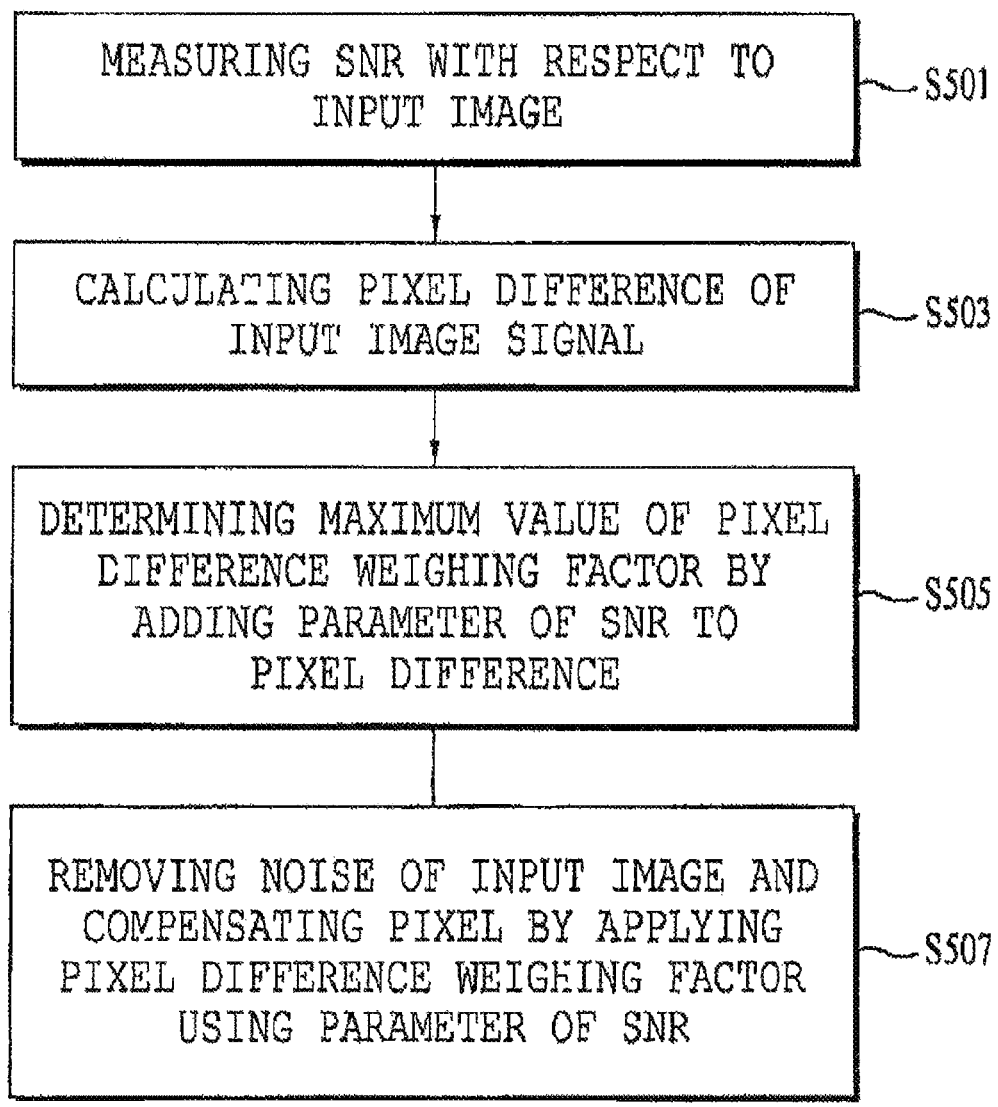
FIG. 5 is a method for removing image noise according to an exemplary embodiment.

FIG. 5 is a flow chart illustrating a method for removing image noise according to an exemplary embodiment of the present invention.

The signal to noise ratio with respect to the input signals is calculated (S501). Here, the input image signal is converted into the frequency signal and the weighing factor is calculated based on the frequency signal. The calculated weighing factor is applied to the frequency signal and the weighing frequency signal is calculated. After the estimated value is calculated based on the weighing frequency signal, the signal to noise ratio is calculated based on the frequency signal and the estimated noise. As the input value of the signal to noise ratio, 1 or 0 of the weighing factor is output from the critical values (a and b, see FIG. 2) by the non-linear function.

The difference of each pixel positioned at each end of the arrangement of the input image and delayed image signals in horizontal, vertical, right and left diagonal directions is calculated (S503). The calculated pixel difference gains 0 or 1 of the weighing factor from the critical values (a and b, see FIG. 2a) by the non-linear function.

The maximum weighing factor applied to the pixel difference to remove noise is determined by using the parameter of the calculated SNR (S505). Here, the pixel difference critical memorizing part 105 memories the calculated pixel difference and the weighing factor (K) calculated based on the pixel difference. Hence, the sizes of the weighing factors applied to the memorized pixel difference are compared with each other and determined based on the parameter of the signal to noise ratio calculated by the SNR weighing factor adding part 106 and the comparing part 107. The maximum pixel difference weighing factor calculating part 108 limits the range of the maximum weighing factors applied to the pixel difference of the input image by using the weighing factor (A) of the signal to noise ratio.

The maximum value of the weighing factors (K) applied to the pixel difference by using the parameter of the signal to noise ratio is limited to the weighing factor (A) of the signal to noise ratio such that noise of the input image may be removed and that the pixels may be compensated (S507).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A device for removing noise in an image comprising:
a signal delay part outputting arrangement of image delay signals generated by delaying input image signals in a predetermined time period;
a pixel difference calculating part calculating pixel difference between the input image signal and the image delay signal and calculating a weighing factor applied to the pixel difference based on the calculated pixel difference by a non-linear function;
a signal to noise ratio (SNR) measuring part converting the input image signals into frequency signals and calculating a weighing factor for each of the converted frequency signals to output a parameter of signal to noise ratio, the output parameter of the signal to noise ratio comprises an input value of the signal to noise ratio and a weighing factor of the signal to noise ratio applied to the input value by a non-linear function; and
a pixel difference weighing factor generating part generating a weighing factor applied to a final pixel difference to remove noise by limiting a maximum value of the weighing factors calculated by the pixel difference calculating part to the weighing factor of the signal to noise ratio output by the SNR measuring part.

2. The device as claimed in claim 1, further comprising:
an operating part subtracting the input image signal from the image delay signal output by the signal delay part.

3. The device as claimed in claim 1, further comprising:
a low pass filter filtering a low frequency image signal of the input image signals and the image delay signals.

4. The device as claimed in claim 3, further comprising:
an absolute value detecting part detecting an absolute value from the filtered low frequency image signals and outputting the detected absolute value to the pixel difference calculating part.

5. The device as claimed in claim 1, wherein the pixel difference calculating part calculating pixel difference between the input image signal and the image delay signal calculates differences of pixels positioned in each end of the image delay signal arrangement in horizontal, vertical, right diagonal and left diagonal directions.

6. The device as claimed in claim 1, wherein the image signal having the weighing factor output by the pixel difference calculating part applied thereto has an equation: $P=KY_{CLF}+(1-K)Y_{DLF}+Y_{CHF}$ (P: Image Signal, K: Weighing Factor, $Y_{CLF}$: Low Frequency Signal Of Input Image Signal, YDLF: Low Frequency Signal Of Image delay signal, $Y_{CHF}$: High Frequency Signal Of Input Image Signal).

7. The device as claimed in claim 6, wherein the weighing factor applied to the image signal has a size between 0 and 1.

8. The device as claimed in claim 1, wherein the SNR measuring part comprises, a frequency converting part converting an input image signal into a frequency signal;
a weighing factor calculating part calculating a weighing factor for each frequency based on the converted frequency signal;
a signal calculating part calculating a weighed frequency signal by applying the calculated weighing factor to the frequency signal; and
an estimated noise calculating part calculating estimated noise based on the weighed frequency signal and outputting a parameter of the signal to noise ratio based on the frequency signal and the estimated noise.

9. The device as claimed in claim 1, wherein the pixel difference weighing factor generating part comprises,
a pixel difference critical value memorizing part memorizing pixel difference values calculated by the pixel difference calculating part and the weighing factors applied to the pixel difference values;
a SNR weighing factor adding part adding the parameter of the signal to noise ratio calculated by the SNR measuring part to the pixel difference values;
a comparing part comparing the sizes of the weighing factors applied to the memorized pixel difference values with each other and determining a range of the weighing factors based on the parameter of the signal to noise ratio;
a maximum pixel difference weighing factor calculating part applying the maximum value of the weighing factors applied to a critical value of the pixel difference values to the weighing factor range of the signal to noise ratio based on the result of the determination and calculating a weighing factor applied to a final pixel value to remove noise.

10. The device as claimed in claim 1, wherein the range of the weighing factors (K) applied to the final pixel values to remove noise is $0 \leq K \leq A$ (A: Signal To Noise Ratio Weighing Factor).

11. The device as claimed in claim 9, wherein the pixel difference critical value memorizing part renews and memorizes the pixel difference values of the image signals and the weighing factor applied to the pixel difference values.

12. A method of removing noise in image comprising steps of:
outputting arrangement of image delay signals generated by delaying input image signals in a predetermined time period;
calculating a weighing factor for each frequency from frequency signals converted from the input image signals and outputting a parameter of a signal to noise ratio, the output parameter of the signal to noise ratio comprises an input value of the signal to noise ratio and a weighing factor of the signal to noise ratio applied to the input value by a non-linear function;
calculating a pixel difference value between the input image signal and the image delay signal and calculating a weighing factor applied to the pixel difference value based on the calculated pixel difference by a non-linear function; and
applying a weighing factor to a final pixel value to remove noise, the weighing factor generated by limiting a maximum value of the weighing factors applied to the calculated pixel difference values to the weighing factor of the signal to noise ratio.

13. The method as claimed in claim 12, further comprising steps of:
outputting a parameter of the signal to noise ratio;
converting the input image signal into a frequency signal;

calculating a weighing factor for each frequency based on the converted frequency signal;

calculating a weighed frequency signal by applying the calculated weighing factor to the frequency signal; and calculating estimated noise based on the weighed frequency signal and outputting a parameter of a signal to noise ratio based on the frequency signal and the estimated noise.

14. The method as claimed in claim 12, wherein the calculating of the pixel difference value between the input image signal and the image delay signal calculates differences of pixels positioned in each end of the image delay signal arrangement in horizontal, vertical, right diagonal and left diagonal directions.

15. The method as claimed in claim 12, wherein the image signal having the weighing factor applied thereto in the step of calculating the weighing factor applied to the pixel difference has an equation:

$P = KY_{CLF} + (1-K)Y_{DLF} + Y_{CHF}$ (P: Image Signal, K: Weighing Factor, YCLF: Low Frequency Signal Of Input Image Signal, $Y_{DFL}$: Low Frequency Signal Of Image delay signal, $Y_{CHF}$: High Frequency Signal Of Input Image Signal).

16. The method as claimed in claim 15, wherein the weighing factor applied to the image signal has a size between 0 and 1.

17. The method as claimed in claim 12, wherein the step of applying the weighing factor removing noise to the final pixel value comprises steps of:

memorizing the calculated pixel difference and the weighing factor applied to the pixel difference;

adding a range of the weighing factors applied to the pixel difference values by using the parameter of the signal to noise ratio;

comparing the sizes of the memorized weighing factors applied to the pixel difference values with each other and determining a range of the weighing factors based on the parameter of the signal to noise ratio; and calculating the weighing factor applied to the final pixel value to remove noise by applying the maximum value of the weighing factors applied to the critical values of the pixel difference to the range of weighing factors of the signal to noise ratio based on the result of the determination.

18. The method as claimed in claim 17, wherein the pixel difference value and the weighing factor are renewed and memorized by the input image signal.

19. The method as claimed in claim 12, wherein the range of the weighing factors (K) applied to the final pixel values to remove noise is $0 \leq K \leq A$ (A: Signal To Noise Ratio Weighing Factor).

* * * * *